United States Patent
Bruns

(10) Patent No.: US 6,293,680 B1
(45) Date of Patent: *Sep. 25, 2001

(54) ELECTROMAGNETICALLY CONTROLLED DEFORMABLE MIRROR

(75) Inventor: Donald G. Bruns, San Diego, CA (US)

(73) Assignee: Thermotrex Corporation, San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,866

(22) Filed: Sep. 10, 1998

Related U.S. Application Data

(60) Provisional application No. 60/058,347, filed on Sep. 10, 1997.

(51) Int. Cl.[7] .................................................. G02B 5/08
(52) U.S. Cl. .............................................. 359/849; 359/846
(58) Field of Search .................................... 359/846, 847, 359/848, 849

(56) References Cited

U.S. PATENT DOCUMENTS

| | | | |
|---|---|---|---|
| 4,456,937 | 6/1984 | Iftikar et al. | 360/106 |
| 4,525,852 | 7/1985 | Rosenberg | 378/34 |
| 4,664,487 | 5/1987 | Tam | 359/874 |
| 4,734,557 | * 3/1988 | Alfille et al. | 359/847 |
| 4,798,989 | 1/1989 | Miyazaki et al. | 310/328 |
| 4,934,803 | * 6/1990 | Ealey | 359/845 |
| 5,332,942 | 7/1994 | Rennex | 310/328 |
| 5,877,905 | * 3/1999 | Schwartz | 359/849 |

* cited by examiner

Primary Examiner—Darren Schuberg
Assistant Examiner—Jared Treas
(74) Attorney, Agent, or Firm—Fish & Richardson P.C.

(57) ABSTRACT

A deformable mirror assembly is provided employing a pressure differential across the mirror element to flex the mirror into a configuration. The configuration is determined by an array of positioning members, each having a fixed back end and a movable front end. The invention employs long-stroke electromagnet actuators with built-in position sensing.

1 Claim, 7 Drawing Sheets

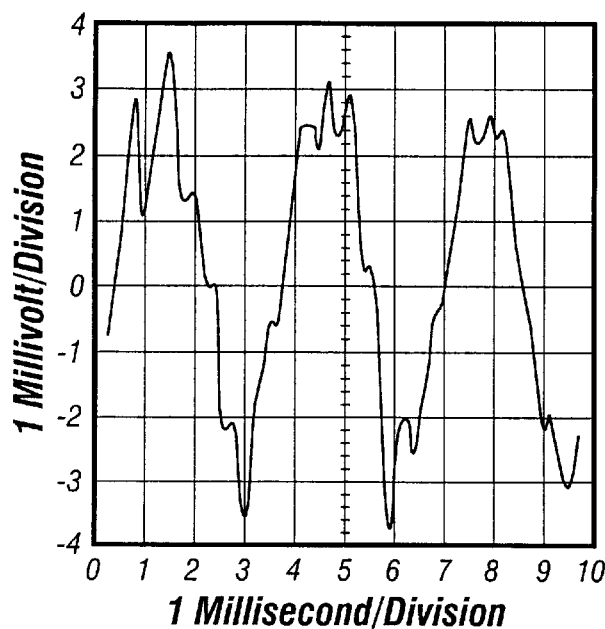
FIG. 13
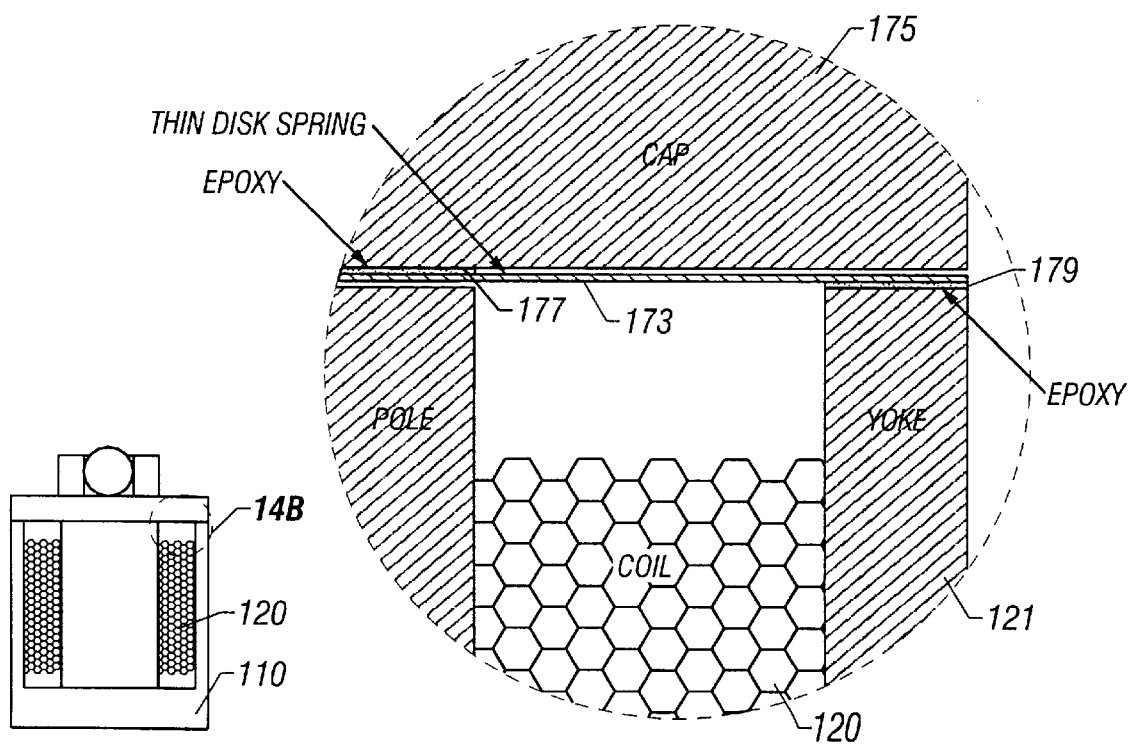
FIG. 14A  FIG. 14B

ELECTROMAGNETICALLY CONTROLLED DEFORMABLE MIRROR

CROSS REFERENCE TO RELATED APPLICATIONS

This application is a conversion of U.S. Provisional patent application Ser. No. 60/058,347, filed Sept. 10, 1997.

FIELD OF THE INVENTION

The present invention relates to actuators, and more particularly to an electromagnetic actuator which operates in conjunction with position sensors to provide a large aperture deformable mirror ("DM").

BACKGROUND OF THE INVENTION

Complex adaptive optics systems previously used piezoelectric actuators to control the DM figure. For example, a 1500 degree-of-freedom segmented mirror using tubular piezoelectric actuators with a 6 $\mu$m stroke was developed by researchers at ThermoTrex. In 1995, FASTTRAC II, a 12 actuator segmented beam combiner for the Multiple Mirror Telescope (MMT), was built using voice coil actuators and capacitor position sensors. In response to astronomical requirements for low-emissivity, large-throw secondary mirrors, prototype adaptive secondary mirrors using 25 voice coil actuators covering a 6-inch square mirror have been built, as well as prototypes with 24-inch diameter deformable mirrors and 60 voice coil actuators. Upgraded MMTs may employ with over 300 actuators. These use fast steering mirrors with voice coil actuators and capacitor position sensors. All of these designs use voice coil actuators with capacitor position sensors to provide feedback to an internal control loop. There remains a need for an actuator which can operate over a longer range and with low maintenance costs.

SUMMARY OF THE INVENTION

The present invention addresses the needs in the prior art by providing an electromagnetically controlled actuator. The actuator is especially useful in applications such as large aperture deformable mirrors. Employment of the actuators with deformable mirrors enables the mirrors to be reliably positioned and replaceable. The invention may employ a simple flat glass substrate gently forced with air pressure against the electromagnetic actuator. The electromagnetic actuator has built-in position sensing. The position sensing may be accomplished with capacitor sensors.

The present invention uses electromagnet actuators coupled with built-in position sensors for closed loop mirror position control. The primary tradeoffs involve the glass substrate thickness against the allowable power dissipation. Both of these variables are easily scaled, leading to a wide design space incorporating manufacturability and performance.

The present invention allows a deformable mirror which may employ multiple different actuators, especially electromagnetic actuators. While piezoelectric, magnetostrictive, or similar actuators offer only the required stroke, electromagnetic actuators can operate over a much longer range and are the preferred actuator. Instead of using an epoxy connection to make up for manufacturing tolerances, a long actuator stroke allows use of a non-rigid attachment. This, in turn, solves the two primary problems encountered in the prior art; the actuator attachment does not use adhesives and the glass figure does not distort from unwanted stresses.

The invention may use a simple flat glass substrate gently forced with air pressure against electromagnetic actuators. This keeps the cost of the mirror optics comparatively low while making the mirror replacement convenient. The invention allows very low maintenance costs over long periods. Electromagnetic actuators have essentially no catastrophic failure modes, and can be driven with low voltage electronics at low power levels. In addition, the mirror is easily replaced if the coating is ever damaged for any reason.

The present invention, based on a flat mirror substrate and long-stroke electromagnet actuators with built-in position sensing, has a number of advantages over more conventional approaches. These advantages include reduced program risk, higher system reliability, improved facility maintainability, and increased optical performance. The control bandwidth and actuator spacing requirements for this DM are good matches for electromagnetic actuators.

The present invention's use of electromagnet actuators provides many advantages over piezoelectric class materials. Piezoelectric-class (PMN or PZT) materials can be made very small, especially since the mirror stroke and total force requirements are not very large. However, since the DM actuator spacing is large, this feature is not important. Being inherently stiff, PMNs or PZTs are also optimal when bandwidths higher than 1 kHz are required. The same stiffness, however, also leads to attachment and residual figure errors. Electromagnetic actuators normally require more mass, and with their moderate electrical inductance, are more difficult to drive at high frequencies. However, since the bandwidth requirement for the DM is only 100 Hz, electromagnetic actuators are ideal.

The back plate for piezoelectric actuators must be very stable and rigid, to prevent loss of mirror stroke. Based on typical DM requirements, electromagnetic actuators are again the optimal choice. For electromagnetic actuators, power dissipation, not stress, limits the stroke. The cost of the auxiliary position sensors and the inner loop control electronics are very small, since these may be mass produced using inexpensive components. Any repairs are infrequent and inexpensive. In other words, manufacturability is designed into the components.

Another advantage of the present invention is that only a simple mirror substrate (flat on both sides) is required, using air pressure to maintain contact between the actuators and the mirror substrate.

This solves the following potential problems. The best mirror coating design can be applied without worrying about damage to a complexly machined substrate, reducing program risk. The finished mirrors can be shipped separately from the mechanical assemblies, and mated in a clean room. This increases mirror lifetime. The force attachments are flexible enough to prevent imprinting or generating high spatial frequency errors. This results in small residual wavefront errors.

Another advantage is the ability to perform all diagnostics, including prototype design and test, on a substitute mirror of similar quality, but without the expensive coatings. In this manner, the finished mirror is held in a protected location, and is only installed during the final tests. This reduces schedule risk by enabling prototype testing early in the program.

Every actuator may be tested during and after final assembly. If an actuator should fail, it is always easily replaced, enhancing maintainability. This testing may be done on the substitute mirror, reducing handling on the final coated mirror. After sufficient testing, the built-in position sensors can be used to verify dynamic range without the use of direct optical interferometry. This further reduces the manufacturing costs and schedule risks. Only after the units are fully completed, tested, and burned-in, need the final coated mirrors be installed.

The mirror substrate is easily replaceable in the event of coating damage, enhancing system maintainability. When the atmospheric pressure difference is released, the mirror can simply be lifted out. The mirror rests against stops on the bottom edge, so the new mirror position will be practically indistinguishable from the original. Depending on the mirror's back side surface quality, recalibration may not be necessary. Closed loop operation can be resumed immediately.

Zero electrical power to the DM assembly results in the free standing shape of the mirror. This may be adequate to meet any open loop flatness requirement, if the mirror's two coatings cancel stresses. If some figure remains, it will be very low order astigmatism and defocus, not higher order, small spatial frequency ripples as occur in piezoelectric designs. To correct this error, the internal control loop is turned on, using preset values at each actuator. Since the invention has essentially no hysteresis, the mirror will be flat.

The invention employs a minimum of precision parts. This reduces risk and cost, since parts can be manufactured at most machine shops, and assembly tasks become routine.

The invention conveniently allows hybrid approaches, mixing the best techniques. For example, other techniques for attaching the mirror substrate to the actuators may be employed, including using a metal-glass frit on top of a posted substrate. FUSITE brand glass-to-metal seals, for example, can be used.

Alternative back plate materials may also be used. Using Zerodur, Invar, or GE-30 Meehanite cast iron may increase the thermal or long-term stability.

The capacitor sensor could also be replaced with, e.g., Kaman Instrumentation eddy current position probes or other commercially available capacitor sensors. These devices meet technical requirements, but are somewhat higher in cost.

Alternate mirror substrate materials include float glass, Pyrex, synthetic fused silica, and other such materials. BK7 is chosen because of cost, availability, surface finish and UV absorption.

BRIEF DESCRIPTION OF THE DRAWINGS

FIG. 13 shows performance of a Kaman inductive position sensor.

FIG. 14 shows an embodiment of the present invention employing a metallic spring.

DETAILED DESCRIPTION

Figure 1:
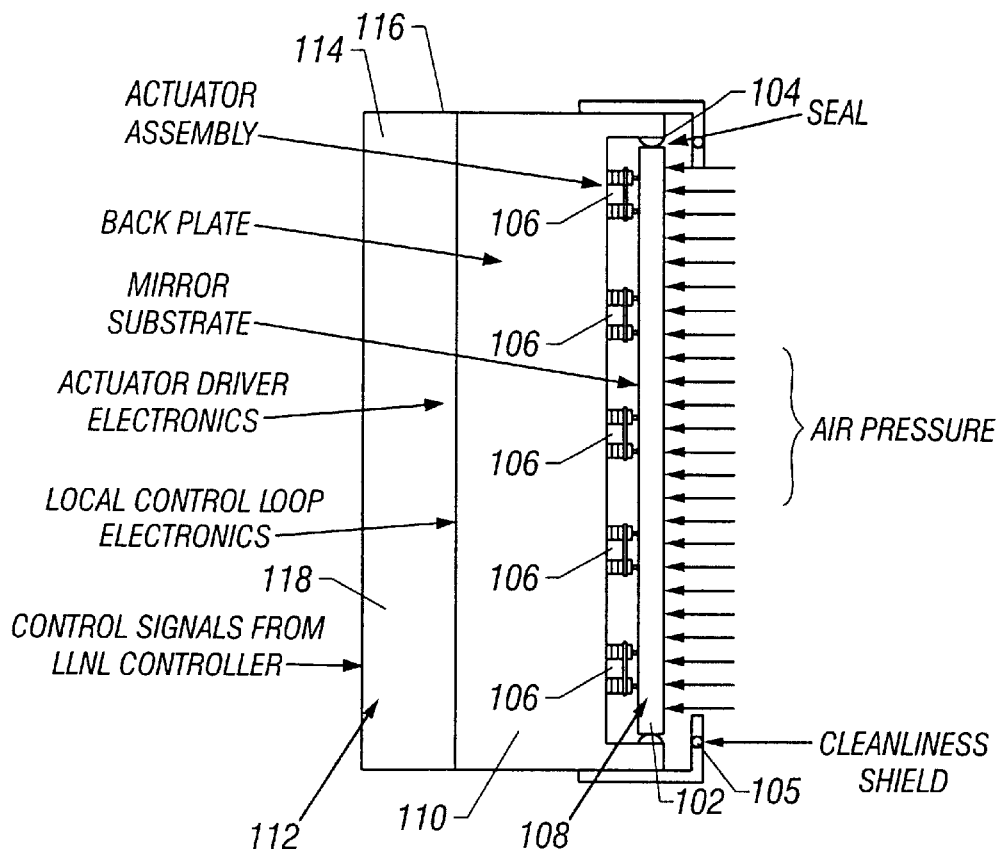
FIG. 1 shows a deformable mirror in cross section.

FIG. 1 shows a schematic drawing of the present invention. A flat 10 mm thick BK7 mirror substrate 102 is gently sealed along the edge with a flexible gasket 104. A small vacuum is drawn with an external pump (not shown), just enough to keep the glass in contact with a plurability of actuators 106. Since the air pressure difference between the outside and the inside need only be about 1% of atmospheric pressure to generate 6 N of force on each actuator, a vacuum-tight seal or adhesives are not required. An anti-reflection coating is applied to the second side 108 of the mirror substrate to reduce possible mirror figure errors. A 100 mm thick aluminum back plate 110 supports the electromagnetic actuators 106 as well as the electronics enclosures 112. One set of electronics 118 receives the analog signals from the external DM controller and uses them with the capacitor position sensors (not shown in this figure) as inputs to the local control loop electronics 114. This inner loop effectively converts the electromagnetic force actuators 106 into position actuators. The actuator electronics driver 116 outputs a varying current to control the force on each actuator 106. The capacitor sensor electronics 152 front end and the driver electronics 154 plug into sockets inserted into the back plate near each actuator (see FIG. 2). The internal servo control loop 156 receives voltage position commands from the wavefront sensor 158.

The mirror is replaceable without changing actuators, minimizing recalibration. All electronics and actuators are replaceable in modules.

Figure 2:
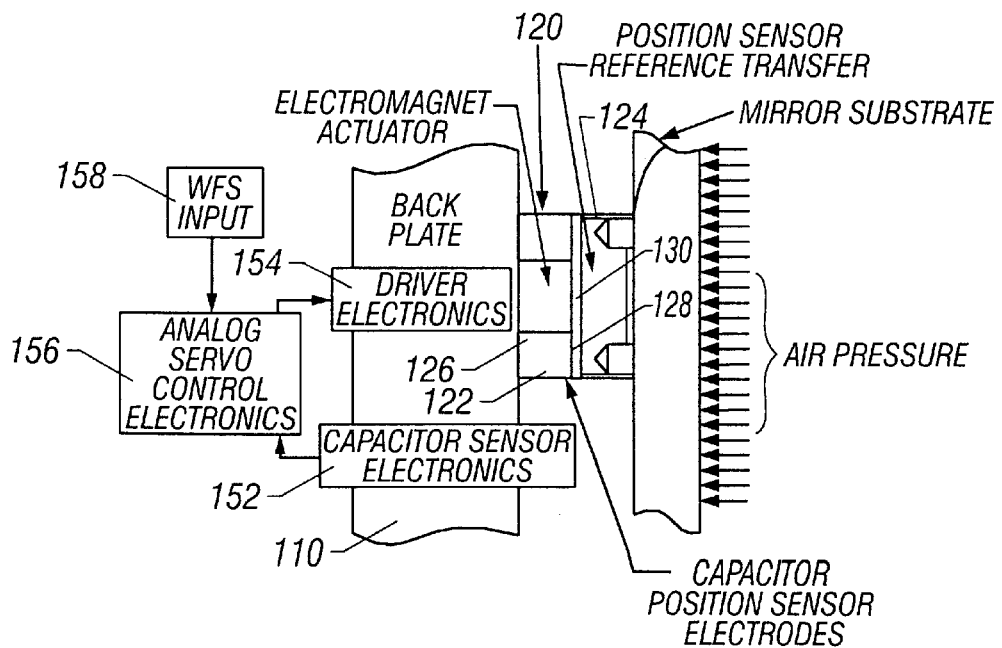
FIG. 2 shows a schematic of an actuator assembly according to an embodiment of the present invention.

FIG. 2 shows a detail of the actuator assembly 106. The complete replaceable unit includes an electromagnet 120, two capacitor electrodes 126 and 128 (forming a capacitor sensor), and a position sensor reference transfer device "(PSRT)" 124. One capacitor electrode 126 is permanently attached to the stable back plate 110. The other capacitor electrode 128 is permanently attached to the ferromagnetic PSRT 124. In this way, the other capacitor electrode is referenced directly to the deformable mirror position.

The electromagnet 120 and the PSRT 124 are kept apart with a small amount of silicone adhesive 130 which determines the spring constant and the available stroke. This prevents torques on the mirror, preserving the high quality surface.

Some of the replaceable electronics modules may be inserted into sockets placed into holes drilled in the back plate. The PSRT 124 permits precise measurements of the mirror shape with no rigid attachments to the mirror substrate, resulting in a replacement feature. The small difference in air pressure on either side of the mirror substrate is used to keep the glass in contact with the PSRT in each actuator assembly.

Figure 5:
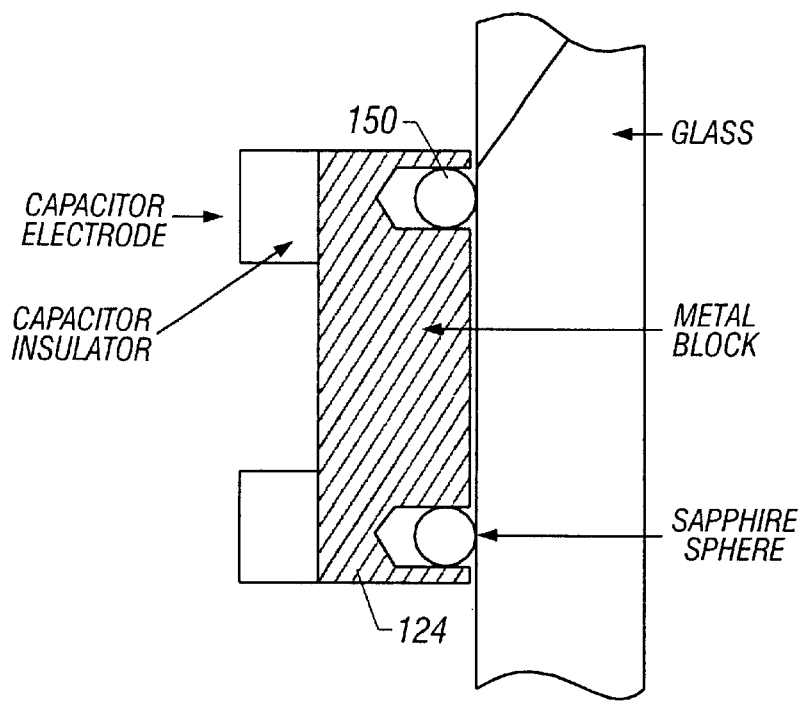
FIG. 5 shows a schematic of a position sensor reference transfer device ("PSRT").

Referring to FIG. 5, the PSRT 124 uses three clear sapphire spheres 150 to locate the mirror surface with respect to its attached capacitor electrode, each of which contacts the clean mirror substrate over a microscopic area, guaranteeing positioning to 10 nm. The metal absorbs and reflects the flashlamp energy, shielding the actuator and position sensor. The effect of the long flashlamp pulse on the spheres is likely negligible, based on their UV transparency, good thermal conductivity, and toughness, resulting in repeatable measurements and a long life. The PSRT plate is made of magnetic stainless steel, shielding the rest of the actuator from the flashlamp pulse. No collimated reflections return to disturb the wavefront sensor. The capacitor electrode is permanently attached to the back of the PSRT. The entire DM assembly is mounted in an, e.g., Aerotech mount as is known in the art, although other comparable mounts could be employed. The input signals are compatible with prior art piezoelectric actuator controllers. An additional cable is required to supply power to the local electronics, and a lightweight vacuum hose is also employed to provide the pressure differential.

Actuator

Electromagnetic actuators are preferred over piezoelectric actuators, based on stroke and reliability. This choice requires different hardware and electronics, but simplifies the assembly with no additional cost.

A number of considerations are involved in choosing the electromagnetic actuator type and design. The forces required to bend the glass mirror, for example, scale as the third power of the glass thickness. Since electromagnetic actuators dissipate power even when not moving, minimizing the total dissipation is important for open loop control. Closed loop control is insensitive to slow thermal drifts.

Another consideration involved is the reduction of manufacturing costs by using as few precision parts and precision assembly techniques as possible. Using long-stroke actuators and the weakest possible coupling springs leads to a design with no precision parts and no precision assembly, yet results in a wide performance margin. The large tolerances and the insensitivity to changes in operating parameters is a partial result of using a robust inner control loop for position sensing, transparent to the wavefront sensor control loop.

Figure 3:
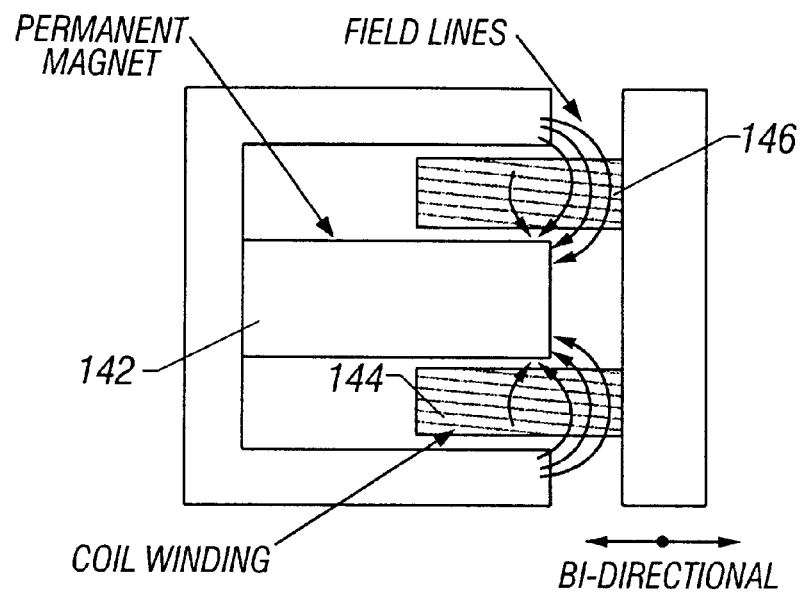
FIG. 3 shows a schematic of a voice coil actuator according to an embodiment of the present invention.
Figure 4:
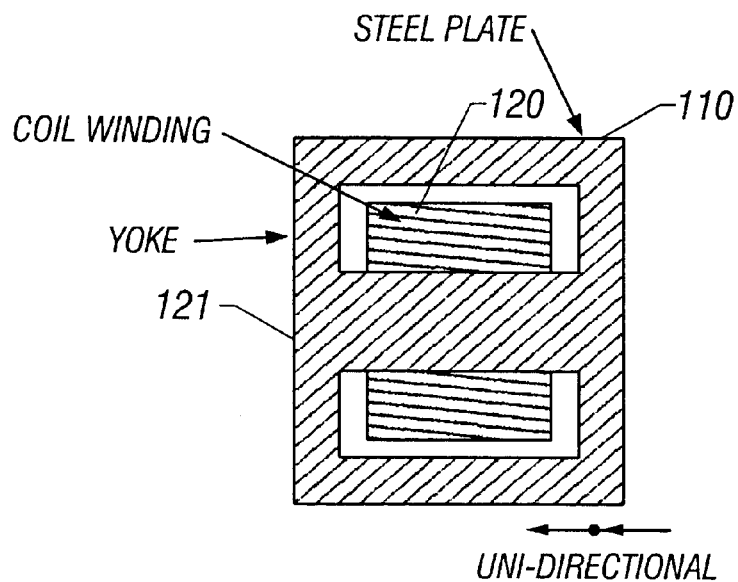
FIG. 4 shows a schematic of an electromagnetic actuator according to an embodiment of the present invention.

The use of electromagnet actuators instead of voice coil actuators is preferred in this design because they are more efficient with respect to power dissipation. FIGS. 3 and 4 show the basic differences between the actuator types.

Referring to FIG. 3, a voice coil actuator is shown with a permanent magnet 142 surrounding electromagnets 144 employing coil windings. Field lines 146 are also shown. The air gap must be relatively large to accommodate the coil windings.

In an electromagnet actuator, as shown in FIG. 4, the gap in the magnetic material may be only 50 μm, or only 0.1% of the total magnetic length, leading to higher magnetic fluxes.

Referring to FIG. 4, the coil winding 120 of the electromagnet is shown within yoke 121. Steel plate 110 is also shown upon which the force from coil 120 acts.

While the force generated by electromagnet actuators is proportional to the input power, the force from voice coils is proportional to the square root of the input power. For forces less than about 0.1 N, voice coils may be the better choice. Voice coils also have strokes easily exceeding 1 mm, and are linear to better than 1% over that range. For forces exceeding 1 N, where the stroke is less than about 100 μm, and internal linearity is not important, electromagnet actuators may be the best choice.

Electromagnet actuators have the disadvantage that they can only pull; they cannot push. For this reason, the electromagnets may be biased in the middle of the designed force range, plus an additional margin. The actuators always dissipate some small amount of power, slightly heating the back plate. The efficiency of the present invention is generally high enough that this is not a thermal problem (see below for details).

Optical cleanliness is another reason to prefer electromagnets over voice coils and permanent magnets. With permanent magnets attached to the PSRTs near the back of the mirror substrate, the mirror's front surface is more likely to attract magnetic debris, which impacts coating reliability. The magnets may be installed in yoke 121 (see FIGS. 4 and 14) to contain most of the field, but some leakage is still present. Electromagnet actuators reduce the leakage by orders of magnitude compared to voice coils, because the magnetic circuit is practically closed. In addition, the magnetic field is only present during operation, not during assembly, and then it is in a clean environment. This further reduces the chances of attracting dirt.

Actuator

Figure 6:
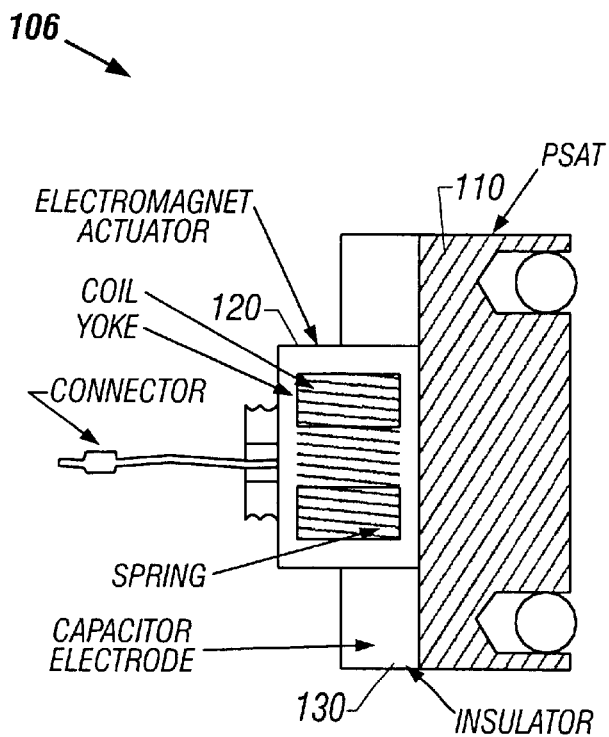
FIG. 6 shows a schematic of an actuator assembly combining a PSRT with an electromagnetic actuator.

FIG. 6 shows the actuator 106 cross section. The actuator 106 is based on using an electromagnet 120 placed 0.1 mm from a ferromagnetic steel plate 110 which is part of the PSRT, kept apart with a stiff spring. One design for the spring between the PSRT and the electromagnet's yoke is a two-part silicone rubber adhesive 130. This results in a spring which is stiff in the perpendicular force direction, but not very stiff in the torque direction. This prevents the actuator 106 from distorting the mirror. The stress in the spring is much less than the fatigue limit, giving an almost unlimited lifetime.

This type of actuator is very efficient. The power lost in the electromagnet coil is proportional to the actuator force. The magnetic field is multiplied by the relative permeability of the iron in the electromagnet, yielding very high magnetic fields for very small currents.

The force generated by the actuator depends on the final design, but the design may achieve 15 N/W in a 20 mm diameter actuator. One prototype actuator built attained 7.5 N/W with a core only 3 mm square. At 30 N/W, all of the powers above are halved, or alternatively the manufacturing tolerances can be doubled. With this parameter and the total static and dynamic forces, the total heat dissipated by each actuator can be determined. Finite element analysis and dynamic force calculations based on the requirements show the following results.

The above embodiment describes an elastomer between the electromagnet and the top piece (e.g., the PSRT) to separate the two parts and to provide a spring to counteract the pull of the electromagnet. In another embodiment, a thin metal spring may be used as described below with reference to FIG. 14.

Between the electromagnet and the top piece, a gap of about 0.010" to 0.020" may be used. A thin, non-magnetic wafer 173 of metal (e.g., molybdenum), about 0.005" thick, or of the same diameter as the electromagnet, is placed between the electromagnet and a top piece 175. The top piece 175 is bonded to the central area of the wafer disk 173 with a thin layer of epoxy 177, about 0.005" thick. The outside of the electromagnet (the yoke 110) is bonded with a similar thickness of epoxy 179 to the other side of the wafer disk.

The result is that the wafer disk holds the top piece and the electromagnet together, with air spacing about 0.005" thick on either side. When the current to the electromagnet is turned off, the wafer disk and epoxy keeps the magnetic parts separated by about 0.015". When the current in the electromagnet is turned on, the magnetic attraction is resisted by the wafer spring, which must bend like a drum head. The limit is reached when the parts are in contact, so the total travel is about 0.005".

The wafer disk 173 may be non-magnetic and flat. The force required by the electromagnet is approximately linear versus distance. The wafer is always in compression, and the stresses are calculated to be small (under the fatigue limit), so the part has a very long lifetime. The geometry is circularly symmetric, so the top part moves parallel to itself as the current is turned on.

The spring constant of the disk is dependent on the inner glue diameter and the outer glue diameter. These diameters may not necessarily be the same as the pole and the yoke, but it is convenient to do so. The spring constant is also determined by the metal stiffness (Young's modulus) and the thickness. While metal is preferred, other thin disks may be used.

Using a flat spring allows the distance between the electromagnet pole and the top piece, and the electromagnet yoke and the top piece, to be equal. This may help improve efficiency and linearity. Other shapes, or varying the thickness as a function of radius, may be possible to change the actuator performance.

Actuator Force and Power Requirements

The force required to bend the glass mirror into a parabolic cylinder with an amplitude of four waves was first estimated by using a reference book formula for bending a rectangular plate held along the center line. Assuming the edges are free, a uniform pressure across the plate should produce approximately equal curvature across the plate. Using the physical parameters for a 10 mm thick glass plate yielded four waves of displacement for the equivalent force of about $F_{bend}$=2 N on each actuator. The force requirements were next confirmed by a more detailed finite element analysis for both the quadratic and the quartic curvatures.

The finite element model (FEM) uses a coarse grid to calculate the forces on each actuator required to generate the specified fourth-order figure with a peak amplitude of one wave. This figure requires the maximum forces. The actuators are placed on a hexagonal grid with an 80.35 mm spacing. The actuators are numbered starting at one corner, and then down successive columns. A flat glass surface, 10 mm thick, is placed on top of the actuators. An air pressure difference of 1% of atmospheric compresses the center actuators by $F_{pressure}$=6 N. The side and corner actuators support about one-half or one-quarter, respectively, of the same area, so those actuators are compressed with average forces of about $F_{pressure}$=3 N and $F_{pressure}$=1.5 N. To compress each actuator to the same height, generating a flat surface, requires biasing the edge and corner actuators with an additional $F_{bias}$=3 N or $F_{bias}$=4.5 N.

Figure 7:
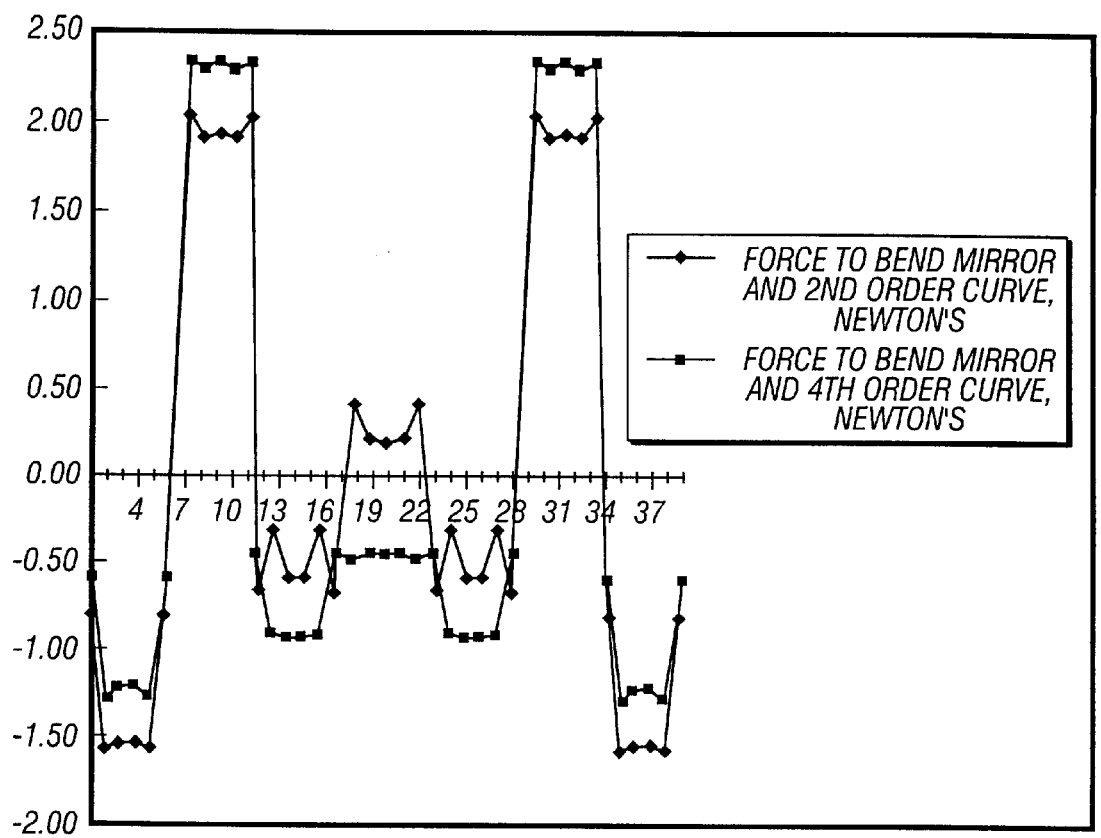
FIG. 7 shows a graph of FEM-calculated forces required to bend a deformable mirror.

Once the mirror is flattened, the calculated maximum forces needed to bend the glass according to the quartic specification is an additional $F_{bend}$=2.3 N per actuator. Only 2 N are required by the 4 wave amplitude quadratic curve. The maximum curvature for the two specified shapes is different only by a factor of two, so the forces are expected to be similar. The actuators in the second row from the edge must exert the highest forces; the outer rows slightly less, and the inner actuators the least. FIG. 7 shows the FEM results for a 10 mm thick glass. This figure shows the FEM-calculated forces, in Newtons, to bend a 10 mm thick deformable mirror. The actuator bias forces have been removed, leaving only the glass-bending forces. The pattern is symmetrical with respect to the center, as expected, and agrees with a simpler analytic estimate.

Next, the back plate is assumed to not be made to a very high precision (or can drift over long time periods), so as to allow for a peak error of 25 $\mu$m (a substantial 0.001"). Using a spring coupling of k=0.2 N/$\mu$m means that some actuators must exert an additional $F_{length}$=5 N to match the height of the neighboring actuators. This spring constant is necessary (as shown later) to keep the mechanical resonances high enough to satisfy the specifications. To move the actuator a distance of 2 $\mu$m beyond that position, as the glass bends, requires another $F_{spring}$=0.4 N.

To accelerate the glass and the attached actuator mass to the required amplitude of 0.5 waves at 100 Hz requires only an additional $F_{100}$=0.04 N from each actuator. To eliminate bench vibrations, up to 0.5 wave at 300 Hz, satisfying the forcetrain/mirror resonance requirement, requires an additional $F_{300}$=0.5 N per actuator. These dynamic forces ($F_{dynamic}$) total 0.54 N.

The minimum bias point of each actuator must be at least $F_{bias}$=3.5 N, to allow for the total of the dynamic forces and the ±2 $\mu$m bending forces. At this constant value, the worse case contact force drops to $F_{contact}$=0.26 N. At a bias of $F_{bias}$=3.5 N, each actuator dissipates 0.23 W.

The worse case corner actuator must be biased an additional 9.5 N, if the back plate shape is off as much as 25 $\mu$m. These actuators dissipate 0.87 W at a constant force of 13 N. The center actuators require a smaller worse-case bias, because those actuators have a larger area of air pressure pushing against them; they require a peak bias $F_{bias}$=8 N. The edge actuators have a worse case bias of 11 N. All of the other actuators fall somewhat lower, since the back plate is not likely to be distorted by 25 $\mu$m everywhere simultaneously. A calculation shows the total power in all the actuators is typically 19 W.

By making the edge and corner actuators slightly shorter than the center actuators, the difference in bias level can be reduced due to the difference in atmospheric forces. This reduces the peak bias level to $F_{bias}$=9 N and the total power to 17 W. More significantly, the edges, corners, and center have the same average power, enhancing thermal uniformity. The disadvantage is that three different length actuators or three different length PSRTs are required. The thermal benefit, however, may outweigh the slight manufacturing disadvantage.

Each actuator's length may be uniform to less than 25 $\mu$m, if this amount is allocated to back plate distortion. Since the final length of each actuator depends only on the thickness of the spring 130 between the electromagnet 120 and the PSRT 124, a simple jig can be used to build the actuators 106 to precisely the same length. In use, the PSRT 124 and the electromagnet 120 will be mounted in a fixture, and then a two-component rubber adhesive silicone is injected between them. When disassembled after curing, the length of each actuator 106 is as reproducible as the jig is stable. When the actuators 106 are installed in the back plate, a torque wrench may be used to ensure reproducibility to within about one micron.

Position Sensor

The position sensor is required to correct the internal non-linearity of the electromagnet actuators and provide an absolute shape reference. The output of the position sensor is the input to a servo control system which feeds back into the electromagnet actuator.

The position sensor reference transfer (PSRT) device portion of the actuator assembly requires reproducibility, but not absolute gain or offset calibration, for closed loop operation. Any differences between the actuator units may be calibrated to zero as part of the DM control software.

PSRT Design

The device shields the actuator and the capacitor sensor from the flashlamp pulse while still accurately referencing the front mirror surface. Only a very small contact area is allowed between the PSRT and the back surface of the mirror substrate, so that wherever the surfaces are mated, there is a minimum of dust between the parts. This ensures stability and reproducibility when replacing mirrors or actuators.

Using a simpler design, for example, a large flat metal or UV-absorbing glass plate, may result in contact of the mirror at the three highest points determined by the shape of the mirror, the plate, and how much force is being used. Any dust trapped between the plates would cause additional variations. If the glass plate is polished and assembled clean, the dust problem can be minimized, but optical contact between the surfaces may result, making disassembly more difficult. The baseline PSRT design, using three well-defined contact areas, is ideal.

An exemplary device similar to the PSRT was built last year. This device assisted calibration of the capacitor sensors in the MMT adaptive secondary prototype. This calibration jig used three sapphire spheres bonded to a flat glass disk, with a capacitor electrode plated onto one surface. When this jig was placed onto another glass disk with a similar electrode, the gap between the electrodes could be determined with the capacitor sensor. Repeatedly removing and then replacing the jig in a standard (not clean) laboratory environment showed reproducibility to the 10 nm limit of the capacitor sensor. These tests showed that the PSRT concept is reproducible.

Three spheres are used in the baseline design, instead of one central sphere, to ensure that the actuator force is always normal to the central axis. Small misalignments or manufacturing tolerances in the electromagnet will not result in torques. This guarantees that the capacitor electrodes always move parallel to the mirror surface, resulting in a stable open-loop calibration. If the spring is uniform enough around the actuator, then one sphere may be adequate.

The compression of the assembly may cause position errors in the open loop case. No argument was found which would cause a closed loop error. For example, the indentation caused by a sphere on a flat plate could cause a potential position calibration error, but simple calculations disprove this. For 6.35 mm diameter spheres, the position error amounts to 60 nm/N for forces near 6 N. The force between the glass mirror and the PSRT changes by ±3 N, so the dynamic error is about ±180 nm over the 4 $\mu$m range, or about ±5 percent. This translates into a simple gain error which is calibrated out. Any change in this constant due to slow fluctuations in the air pressure, for example, are substantially never seen in closed loop operation.

Using larger radius sapphire spheres in the PSRT reduces these numbers even more, allowing open loop operation to even better accuracy. The contact area between the mirror and 6.35 mm spheres is defined by a 120 $\mu$m diameter circle for forces near 6 N. Small contact areas are advantageous as dust between the sphere and the plate is highly unlikely. If the tips of the sapphire spheres on a soft diamond polishing cloth after press fitting into the metal plate, then the local radius of curvature may be increased to a much larger value. This was performed with the calibration jigs used for the MMT adaptive optics discussed above. The local radius is estimated at 1 meter, resulting in a contact circle 5 times wider. The new position error also decreases by 5 times, to about 12 nm/N. This number reflects a 1% gain error, and is negligible in all types of operation.

Since sapphire is transparent to UV radiation, the effect on the PSRT should be minimal. The radiation will pass through to the metal PSRT, where the light will be absorbed into the walls of the hole. Ray tracing calculations show that a parallel light beam will be compressed by a factor of 300 in the area near the sphere's exit face, but since there is no optical coating on the sapphire, this passes through unaffected. The small area of the sphere already limits the input energy to about 3 joules, and adding a concentric shield to further limit this amount is possible. The total heat absorbed by the PSRT will be dissipated through the back plate, returning to thermal equilibrium well before the next pulse.

The spheres need not use an epoxy; they may be press fit into place. Inexpensive grade 25 sapphire spheres are commercially available from jewel bearing companies with diameter tolerances of less than 1 $\mu$m. Thus, machining the holes for a press fit does not require individual matching. The polished metal PSRT face, facing the laser beam, can be made slightly convex, to further prevent HeNe light scattering back into the Hartmann sensor.

The effect of having three separate contact points to apply the actuator force is calculated to be negligible. Using the equations for a deformable plate, the estimated peak deformation on a 20 mm diameter pattern of three points is only 1.5 nm at 6 N. This value is negligible compared to the surface quality requirement.

Position Sensor Design

The position sensors described are capacitor sensors developed specifically for this type of application. Other sensors with an adequate resolution and bandwidth, including inductive sensors and commercial capacitor sensor systems, may be used but are currently more expensive.

Capacitor sensors may be used in, e.g., fast steering mirrors and the MMT (discussed above) adaptive secondary, which requires over 300 sensors. The design is advantageous for the DM, since small strokes are required and the operating conditions are under stable atmospheric conditions.

Figure 8:
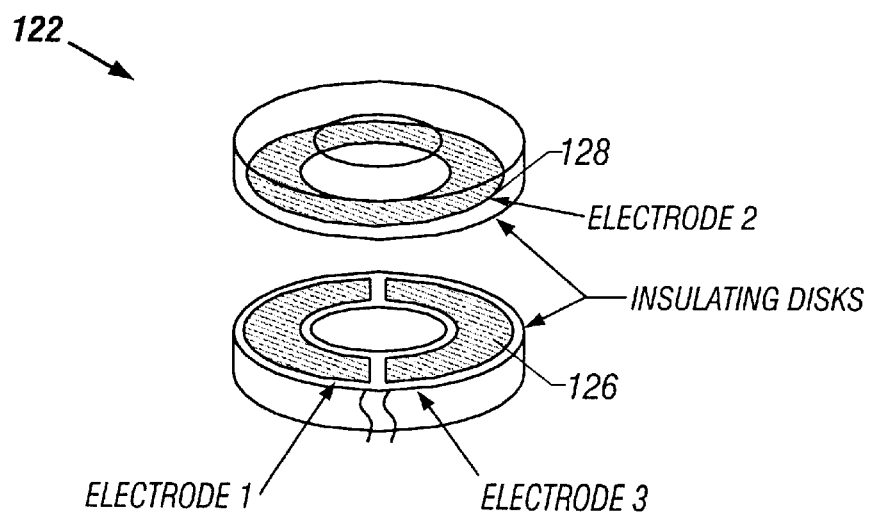
FIG. 8 shows a capacitor sensor made from metal electrodes plated on two insulating disks, according to an embodiment of the present invention.
Figure 9:
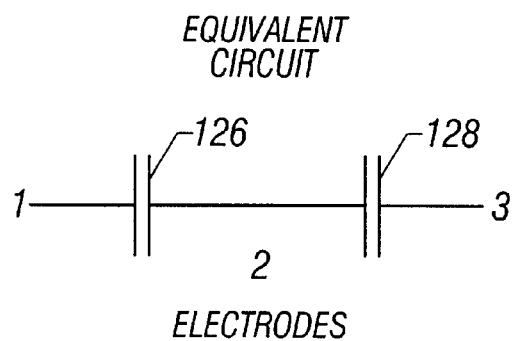
FIG. 9 shows an equivalent circuit of the two electrodes of FIG. 8.

Referring to FIGS. 8 and 9, the capacitor sensor 122 is made from metal electrodes 126 and 128 plated on two insulating disks. The electrode attached 126 to the back plate 110 has a split electrode, while the one attached to the PSRT 124 has a continuous coating. When the disks are placed close together, they form two capacitors in series with a nominal effective capacitance of 30 pF (see FIG. 9).

The capacitor electrodes 126 and 128 are metallized surfaces on thick insulators. These can either be plated directly onto glass disks, or made from disks of glass-epoxy printed circuit board material, or some hybrid combination. Using 50 $\mu$m thick, gold-plated copper foil reduces the chance that the electrodes will become damaged during assembly and handling. A disk machined from a harder metal can also be used; using a relatively thick material does not impact the design. Simple electropolishing of the final surfaces can be done to improve the finish of a machined disk. Precise diameters are not required, since this can be advantageously calibrated out after final assembly. The best electrode combination can be determined during the design phase; thick printed circuit board material may be used in a baseline design.

One disk is epoxied to the back of the PSRT, while the other disk is epoxied to the back plate. Two wires emerge from the second disk, leading to the capacitor sensor input stage buried in the back plate. When placed a small distance apart, the three electrodes act as two capacitors in series. While this decreases the possible capacitance seen by the sensor, the advantage is that the removable PSRT has no electrical connections.

Small gaps lead to higher position sensitivity, but the gap between the electrodes must be at least 25 μm to accommodate the uncertainty in the actuator/back plate location. If the gap is nominally 50 μm, then the nominal capacitance for the series connection is 30 pF. A change in position of only 5 nm then leads to an output voltage change of about 1 millivolt, a large signal compared to noise generated by the other electronic components.

Figure 10:
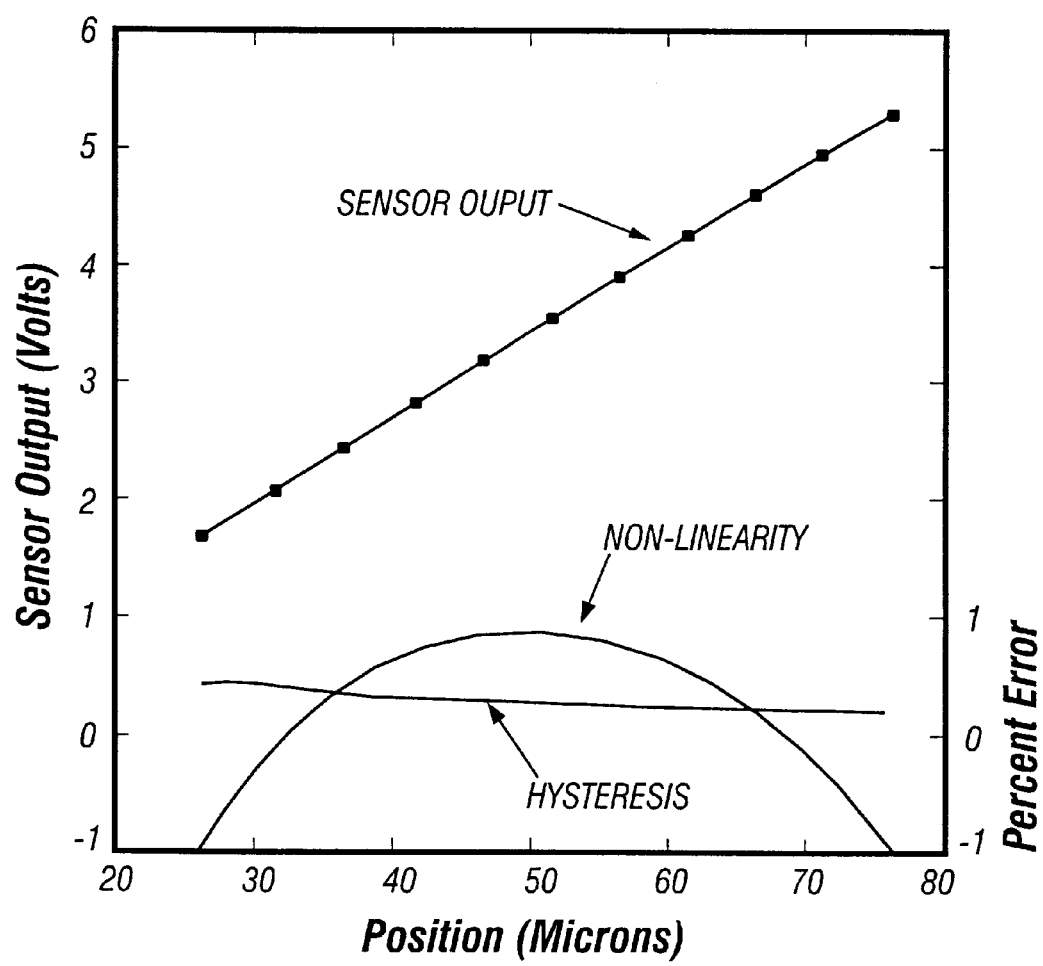
FIG. 10 shows the linearity of the capacitor sensor, as well as hysteresis.

FIG. 10 shows the performance of the capacitor sensor. The graph shows the output of the capacitor sensor, in volts, as a function of gap distance from a fixed electrode. A mechanical stage holding a capacitor electrode was moved first from 75 μm to 25 μm, then from 25 μm back up to 75 μm. The plots 205 and 207 in both directions are shown practically on top of each other, and the relative difference, in percent, is plotted as the nearly flat line just below them. Hysteresis is apparent, and the best fit to a straight line shows non-linearity. The linearity error from a least squares fit is shown as the curved line 209. This data shows that the hysteresis is less than 0.5% and the non-linearity is less than 1% over the full 50 μm range. These numbers include the effects of the mechanical stage, so the sensor is somewhat better. Stray capacitance and fringe field effects in the electrodes, as well as the mechanical stage backlash, causes these minor errors.

Figure 11:
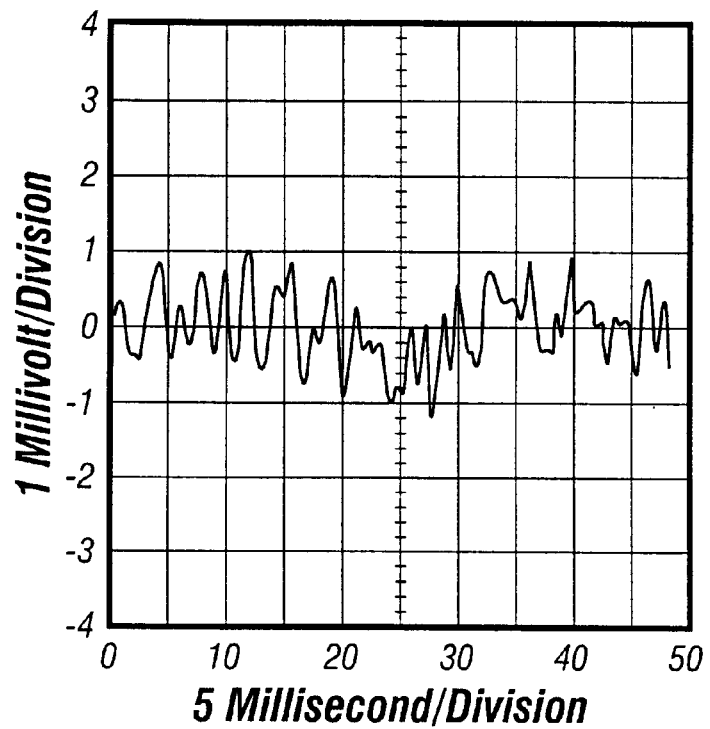
FIG. 11 shows a graph of the noise from the capacitor sensor.

FIG. 11 shows the capacitor sensor noise. A fixed capacitor is used at the input, to eliminate mechanical vibration effects on the measurement. The vertical scale is 10 nm/division. The bandwidth is set at 800 Hz. The RMS noise measures only 5 nm, easily small enough to meet system specifications.

Figure 12:
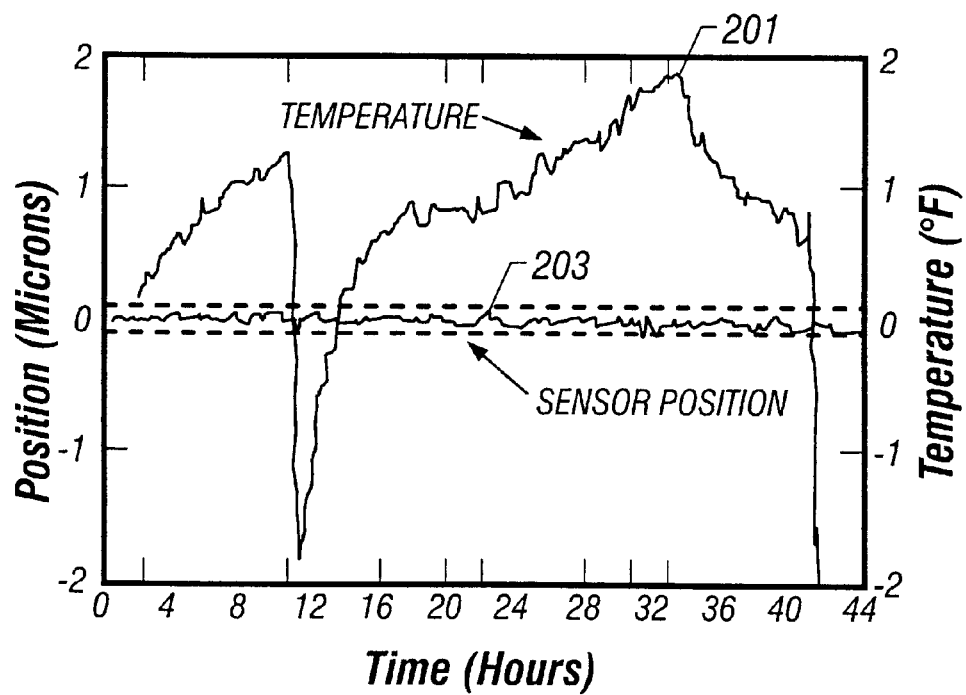
FIG. 12 shows measurements of the capacitor sensor creep.

To verify long term stability, the same capacitor sensor output was measured for several days in combination with a PSRT-type device. A glass disk with a capacitor electrode was placed on top of another glass disk, using three sapphire spheres as spacers, polished down to 6.411 mm diameter. Between the glass disks was placed another glass disk, 6.350 mm thick, also with a capacitor electrode. This combination resulted in an air gap capacitor with a gap of 61 μm, close to what was expected in the electromagnet actuator. The outputs from the capacitor sensor and a temperature probe were recorded by an A/D card in a PC. The room temperature was allowed to drift by turning the thermostat off during the measurements. FIG. 12 shows the resulting data. The temperature drifted over a 4° F. range, shown as the large amplitude trace 201. The small notches were due to quantization errors in the 12 bit A/D card. The flatter line 203 is the capacitor sensor output, with the nominal gap distance subtracted. The two dashed lines are markers at ±100 nm. The drift over a two-day period (44 hours) included mechanical drift as well as drift in the A/D card, but was still less than 40 nanometers. This is equivalent to a creep of less than 1%, based on a 4 μm range. Any slow drift in a closed loop system will be negligible.

A longer stability measurement, using a fixed capacitor instead of a PSRT, was also made to verify that the sensor electronics were stable. The capacitor sensor electronics were stored inside a small chamber, and left undisturbed for a week; the temperature was allowed to drift over 4° F. The voltage output was monitored with a four digit voltmeter at least once per day after the measurements began. The output voltage wandered by only ±2 mV, compared to the value recorded after a 1 minute warm up period. This is equivalent to a 5 nm RMS drift over the period. Some of the drift could have been due to the voltmeter drift, but since the numbers were so small, no attempts were made to determine this number with higher precision.

The capacitor sensors for the MMT are built into narrow circuit boards that neatly fit into holes in the back plate. The boards plug into connectors at the sensor input end, and each sensor generates about 0.3 W of heat. The same style of boards will be used in this DM. The heat can be further reduced by using lower power op amps, but since this heat is constant and well sunk to the back plate, this may not be required.

The insulators used in the capacitor electrode substrates do not have significant precision requirements. The flatness can be a few microns, since this is still small compared to the total gap. The shape affects the absolute capacitance, but it is not necessary to know this value. Tip and tilt over the capacitor electrodes is also approximately averaged across the area of the electrodes. For a tilt equivalent to 10 μm across the electrodes, for example, a rigorous calculation shows the nominal capacitance at a 50 μm average gap changes to an equivalent gap of 50.17 μm. This is a static error, with only a minor effect on the gain coefficient.

For the case where the DM is curved, the capacitor electrodes are also tilted relative to each other at each sensor. This generates a small error, since the position measurement is non-local. The worse case tilt is at the edge, where the tilt adds an additional 0.6 μm difference across the electrodes. If the electrodes are initially perfectly parallel, this slope leads to a calculated sensor error of less than 1 μm. If the electrodes are initially tilted as much as 10 μm (about one fifth of the gap distance) due to manufacturing tolerances, then the effect of the worse case curvature at the edge calculates to a 23 nm open loop error. The actual errors are between these values, most likely in single digit nanometers. The closed loop error is, of course, negligible. Therefore, even when the DM is at its maximum curvature, the effect of a non-local measurement leads to a negligible error.

To easily assemble the capacitor electrodes parallel to within 10 μm requires a special material. 125 μm diameter microspheres may be used, mixed into the epoxy, to maintain a precise gap. These microspheres also provide a uniform bond line, making each electrode assembly identical to every other assembly. Since this technique does not require precision jigs or skills, this may be part of a baseline procedure.

The insulating disk fixed to the back plate is at the temperature of the back plate, which may always be close to the ambient. This leads to an open loop piston error of less than 100 nm per degree, if standard glass-based insulating materials are used. Closed loop performance does not see this slow thermal change. The tilt error is much less, as long as the temperatures are uniform across the mirror. The insulating disks may be epoxied to the PSRT and the back plate without thermal stress, since the operating temperature range is so small.

Kaman Instrumentation makes very small inductive position sensors which may also be used with this design. The sensor probe includes a simple encapsulated wire coil placed close to an aluminum target. The noise level is demonstrated in FIG. 13, which shows the probe measuring a 50 nm peak-peak 300 Hz sine wave. The noise from the ripple near the tops of the peaks may be estimated to be about 5 nm RMS, when filtered to a bandwidth of 2 kHz. The full scale range of this particular probe is 100 μm, outputting 10 V.

Control Loop Design

The position sensors generate an analog output which is fed into an analog proportional-integral-derivative (PID) servo control loop. The performance of the capacitor sensor is the main limiting component of this design. The existing PID circuits drive high power voice coil actuators.

The PID controller described here uses an analog voltage from a wavefront sensor to command the deformable mirror position. The PID output is a current which goes to the electromagnet actuator. The PID circuit for the fast steering mirrors may be re-engineered to use several micropower, surface mount opamps, to allow mounting on the back plate near the actuator without impacting thermal performance. The peak forces typically required by the actuators lead to drive powers less than 1 W. To enhance manufacturability, the electromagnet coils use 36 gauge or heavier wire, so resistances of about 25 ohms result. This leads to a required current of about 200 mA at 1 W. Since the current is unipolar, this can easily be supplied with a single transistor in a voltage follower stage.

Two potential electronics problems include signal crosstalk from the adjacent sensors and EMI susceptibility. To eliminate crosstalk, the same reference signal may drive all the capacitor sensors. EMI susceptibility may also not be expected to be a problem, based on the projected voltage levels of 13 V/m. Even completely unshielded, the largest internal circuit dimensions are on the order of 100 mm, so the maximum voltages across the circuit elements is limited to about 1.3 V. This voltage is not large enough to damage any of the electronics components. If required, additional measures, such as EMI filters or protective diodes can be added. The EMI frequency spectrum is relatively high compared to the control loop bandwidths, so low pass filtering should be effective.

Although compatible with high voltage drive signals as required, more manageable 10 V levels could be used in a production design. While a completely analog system is the baseline design, a digital system could be an option. Digitizing the input and output commands may be used, to allow for future flexibility, including fiber optic inputs. Since the closed loop control bandwidth is slow, a single embedded microprocessor can handle an entire DM.

Actuator Assembly Results

One difference between the above design and a piezoelectric design is that less heat is generally dissipated in the piezoelectric design. On the other hand, the surplus electromagnet actuator stroke is many times that of a piezoelectric actuator, so the reference surface is allowed to drift considerable distances without penalty. When the stroke required to make up for mechanical assembly tolerances and repair tolerances is included, the advantage of a long stroke actuator becomes apparent.

The electromagnet actuators are inherently failure resistant. In addition, they screw into place without affecting the mirror's performance. Because of their long stroke and built-in position sensor, accurate installation is not required. The driving electronics and control loop circuits operate at low voltages and currents, dissipating less than one watt, so they are also not likely to fail due to thermal overload. For easy maintenance, all of the electronics may be built as modules.

Mirror Assembly The 1% atmospheric pressure difference required to keep the glass in contact with the actuators, for the baseline design, produces about 6 N per actuator. This is twice the sum of the peak forces required to bend the glass, accelerate the mirror, and change the actuator lengths.

Referring to FIG. 1, to accommodate this slight pressure difference, a soft gasket 104 is placed in the mirror housing behind the optical protection of a cleanliness shield 105. The gasket 104 contacts only the edge of the glass, and it does not have to make a perfect seal. A Teflon or thin metal flange may suffice, which flexes when the mirror is installed. The idea is to prevent distorting the mirror, so the force due to the gasket must be less than that provided by the nearby actuators. The sealing forces are perpendicular to the mirror's face, so no optical distortion results from the seal.

Aligning the center of the mirror is not required to very high accuracy, since the wavefront corrections are relatively widely spaced. It is sufficient to let the thin mirror rest on two hard points on the bottom, and let the gasket center the mirror in the horizontal direction. This mounting technique allows a new mirror to be installed in a matter of minutes, with only minimal recalibration required. No rigid attachments on the glass are necessary. The cleanliness shield 105 also acts as a safety catch to prevent the mirror from falling out during earthquakes.

Pressure-Induced Distortion

A higher atmospheric pressure difference requires proportional changes in the actuator bias values. The only other impact is on the residual shape of the glass between the actuator points. These effects may be estimated with calculations based on plate deformation formulae with point forces and uniform pressures. The calculations show that a pressure difference large enough to push 6 N on each actuator causes an RMS deformation between actuators of only 5.6 nm. This parameter has a margin of at least two before it starts to impact the figure. Only coarse pressure regulation is thus required to maintain the figure.

Air Pressure Regulation

The vacuum should be regulated to ±10% to prevent more than 0.5 N change in the reaction force per actuator. This change in force affects the thermal distribution in the back plate, but that is a slow change, easily accommodated by the control system. The reason that the distribution changes is because the corner and edge actuators support less mirror area than the center actuators, so they have a smaller force pressing against them. A change in the air pressure changes the relative forces between the actuators, which affects the required bias forces.

Pressure sensors with high resolution in this pressure range are available, and can be used in a control or monitoring system, if required. For example, EG&G IC sensors have a 0–2 psig sensor built into a number of common IC packages. This could be incorporated into a proportional feedback loop to stabilize the air pressure to a high precision.

The required vacuum pump need not be capable of a high vacuum or high volume. More importantly, it should operate quietly and create a steady vacuum. The system may use a compact regenerative blower, which is similar to a miniature vacuum cleaner. The input connects to a ballast reservoir, with air dampers, if needed, to further stabilize the pressure. Since the mirror seal design is meant to be leaky, there is a constant flow of air into the reservoir from the mirror. A simple mechanical vacuum pressure regulator is sufficient to maintain a constant pressure. If an appropriate vacuum system is already plumbed into the facility, the regulator can tap off of that system.

One pump may handle multiple units, each with individual regulators. In the case of pump failure, the DM will not be damaged; operation may resume as soon as the pump is replaced. Pump operation is not required unless the system is operating.

Back Plate Assembly

A solid, 100 mm thick aluminum back plate 110 (see FIG. 1) provides thermal uniformity. This thickness provides a back plate 1000 times stiffer than the 10 mm thick glass substrate, so only nanometer displacements result when the mirror is deformed by microns. This is likely negligible, even under open loop control. The back plate has holes drilled for the position sensors and the actuators, but only a small fraction of the total material is removed. The effect of these holes on the thermal or physical properties is negligible.

Material Selection

To minimize small residual thermal effects, cast aluminum tooling plate or cast Tenzalloy may be used and are known to be thermally stable due to their low stress casting technique. Several 1.5 meter diameter astronomical mirrors made from Tenzalloy were tested 25 years after manufacture, with creep measured on the order of 0.5 $\mu$m per year.

For more strength, aircraft grade 6061-T6 alloy is preferred. This material can be stabilized either by heat treating or by vibrational stress relieving. Heat treating after rough machining involves annealing at an 425° C. for two hours, followed by a cooldown of 10° C./hr down to 250° C. Final detailed machining would not cause additional stresses. As an alternate, Bonal Technologies "Meta-Lax" subharmonic stress relieving process involves vibrating the finished product just below its natural resonance, accomplishing the same end result. This procedure has been successfully used in stabilizing laser cavities.

If an iron back plate 110 is required for better long-term or thermal stability, then the same must be substantially light-weighted. This, in turn, may compromise the stability for which it was selected. The actuator spacing easily allows for this lightweighting; the main penalties here are in machining costs (unless it becomes cost effective in quantity to cast to a near final form) and some loss of thermal uniformity.

Thermal Response

The electromagnet assembly 106 is conductively cooled by direct contact with the back plate 110, leading to a nearly isothermal arrangement. The back plate 110 has enough thermal inertia to be considered constant compared to the closed loop bandwidth. In the open loop case, the powers are small enough and reproducible enough to lead to accurate mirror figures.

An approximate calculation shows that the back plate expands 0.5 nm/sec for a 0.5 W per actuator input. This results in a piston term, so it can likely be neglected. The differential expansion is of a greater concern, but as long as the thermal time constant is on the order of minutes, this is not a problem for a closed loop controller operating at 10 Hz. Using Invar or Zerodur for the back plate would alleviate even this expansion, but at a higher cost.

The worse case local thermal expansion for aluminum is easily calculated. The thermal time constant may be estimated from the thermal conductivity, specific heat, and material density to be about 0.4 seconds across the position sensor's 30 mm diameter. If all the power generated during one thermal time constant stays localized in a 15 mm hemispherical radius, then the local height rises about 1 nm. This amount of piston is still negligible in both open loop and closed loop operation. It is apparent that there is substantial design margin with respect to the local thermal effects.

The thermal effect of 19 W into the back plate creates primarily a piston effect as the back plate expands. Because some actuators have additional bias power, there is some static thermal pattern in the back plate. Because of the high thermal conductivity and large thermal mass of aluminum, this is negligible in closed loop operation. If detailed thermal analysis later shows some open loop problem, the actuators can be augmented with an additional simple resistive heater. The electronics will be modified so that each actuator always dissipates the same constant power (nominally 0.5 W), effectively eliminating any thermal patterns.

Mounting Considerations

To prevent distorting the back plate, the DM is mounted in the Aerotech mount at three points. Because this design uses actuators with a much larger range than one using piezoelectrics, it can tolerate significantly more stress. The primary benefit from this is that the mounting can be significantly more rigid, leading to higher resonant frequencies and higher performance. The cleanliness shield 105 (FIG. 1) is made thin enough so that it does not distort the back plate figure when it is attached.

Assembly and Calibration Procedure

The present invention, using an easily replaceable mirror, makes assembly and calibration very simple. Large diameter optical test stations in controlled atmospheres are not required. The basic procedure is to first assemble the unit without the mirror substrate, calibrate the position sensors with a master flat, then install the substitute mirror. After dynamic range tests are complete, the substitute mirror is removed and the unit shipped. Inside a test area, the final mirror is installed and calibrated to the wavefront sensor. This procedure guarantees excellent optics. This entire procedure is presented here in more detail.

Assembly Procedure

The back plate is machined flat to within 5 $\mu$m, and this verified by using standard machine shop tools. The capacitor electrodes are epoxied to the back plate and the electrical connections are made. The actuator assemblies are then cleaned and installed with torque wrenches under clean room conditions. The unit is then mounted in the Aerotech mount.

Position Sensor Calibration

The capacitor position sensors will all have similar calibrations, but even a 2% offset difference results in a 1 $\mu$m error at the nominal 50 $\mu$m gap. To calibrate this offset requires inputting a known position for each sensor. The effect of slightly different gains in each actuator is negligible over the dynamic range, or can be calibrated away later. The best way to accomplish this calibration is to use a rigid master flat. A 50 mm thick glass flat may be advantageously employed, polished to better than 20 nm RMS over 100 mm areas, but allowed to have up to 250 nm RMS figure error over the entire surface. This master flat is installed in the place of the DM, and the output of each capacitor sensor is recorded with the standard atmospheric pressure difference of 1% holding the flat against the actuators. The actuator force is set to zero for these measurements.

The master flat can be removed and replaced, verifying reproducibility. The effect of the 250 nm distortion over the entire surface means that when this flat is replaced with the final mirror, the final mirror will have the same 250 nm distortion. This is adequate to meet the open loop figure requirements. The errors due to the back plate's figure is automatically calibrated out when the master flat is used.

Mirror Installation and Actuator Replacement

After each capacitor position sensor is calibrated, the substitute 10 mm thick mirror is installed. Applying the same constant inputs into each sensor, via the wavefront sensor command input connector, the mirror figure replicates the master flat. Full aperture interferometric testing is not yet required, since the mirror should be able to deform to any smooth figure near a true flat. By using subaperture testing along each edge, the actuators have the required four wave stroke for quadratic deformations and one wave for quartic deformations. The output of each capacitor position sensor indicates that the mirror position is reached, and the PID control loop shows a null at each actuator. Subaperture testing is also used to confirm the lack of higher spatial frequency errors, allowing the calculation of the RMS figure. Once the mirror figure is demonstrated, the mirror is removed and replaced to show reproducibility. When the mirror is removed, it is convenient to perform actuator replacement. A random actuator or electronics module is replaced, and after installing the mirror and applying the same input commands, the mirror figure is evaluated. If necessary, a new control voltage can be determined by observing the mirror with a subaperture interferometer, adjusting the input for the best mirror figure.

Final Mirror Calibration

The completed DM assembly, minus the final mirror, is shipped to a test area. Using the wavefront sensor is the most practical way to complete the final calibration to a true flat figure. The final mirror is installed in the clean room. When the power is first applied, the shape of the master flat appears. Closing the control loop, using the reference flat, generates a new set of control values. These are saved, completing the calibration.

While the invention has been described in considerable detail with respect to a specific embodiment, one skilled in the art will recognize that numerous departures and variations from the described embodiment may be employed. Accordingly, the scope of the invention is defined only by the scope of the claims appended hereto, and equivalent thereof.

What is claimed is:

1. A deformable mirror assembly comprising:

a deformable mirror element having a front face and a back face and a perimeter surrounding and connecting the front face and back face;

an array of positioning members, each having a fixed back end and a moveable front end, the array located behind the mirror element;

wherein each positioning member comprises an actuator, comprising:

a first end and a second end;

a yoke fixed relative to the first end;

a coil fixed to the yoke;

an attractive member fixed relative to the second end and selectively attractable to the yoke via energizing the coil; and an elastically compressible member prebiasing the attractive member away from the yoke;

wherein the compressible member is an elastomer molded in situ between the yoke and the attractive member.

* * * * *